(12) United States Patent
Squier et al.

(10) Patent No.: US 6,787,217 B2
(45) Date of Patent: Sep. 7, 2004

(54) THERMOPLASTIC FILM LABEL COMPOSITE WITH A PRINTABLE, UNTREATED, CAVITATED SURFACE

(75) Inventors: Jo Ann H. Squier, Bloomfield, NY (US); Robert Wayne Osgood, Jr., Farmington, NY (US); Karen B. Perez, Pittsford, NY (US); David Randall Williams, Fairport, NY (US)

(73) Assignee: ExxonMobil Oil Corporation, Irving, TX (US)

( * ) Notice: Subject to any disclaimer, the term of this patent is extended or adjusted under 35 U.S.C. 154(b) by 0 days.

(21) Appl. No.: 10/282,783

(22) Filed: Oct. 29, 2002

(65) Prior Publication Data

US 2004/0081776 A1 Apr. 29, 2004

(51) Int. Cl.⁷ .............................. B32B 27/32; B32B 5/22
(52) U.S. Cl. ................. 428/195.1; 428/516; 428/317.9; 428/354; 428/910; 428/461; 264/45.9; 264/46.2; 264/173.15; 264/173.28
(58) Field of Search ............................. 428/354, 316.6, 428/910, 195.1, 461, 516, 317.9; 264/45.9, 46.2, 173.15, 173.28

(56) References Cited

U.S. PATENT DOCUMENTS

| | | |
|---|---|---|
| 3,753,769 A | 8/1973 | Steiner .................. 117/122 H |
| 4,214,039 A | 7/1980 | Steiner et al. .............. 428/414 |
| 4,377,616 A | 3/1983 | Ashcraft et al. ............ 428/213 |
| 4,447,494 A | 5/1984 | Wagner, Jr. et al. ........ 428/349 |
| 4,632,869 A | 12/1986 | Park et al. ................ 428/315.5 |
| 4,741,950 A | 5/1988 | Liu et al. .................. 428/315.5 |
| 4,865,908 A | 9/1989 | Liu et al. .................... 428/248 |
| 4,961,992 A | 10/1990 | Balloni et al. .............. 428/332 |
| 5,019,447 A | 5/1991 | Keller ......................... 428/327 |
| 5,057,177 A | 10/1991 | Balloni et al. ......... 156/244.11 |
| 5,063,264 A | 11/1991 | Nakajima ................... 524/118 |
| 5,176,954 A | 1/1993 | Keller et al. .............. 428/317.9 |
| 5,667,872 A | 9/1997 | Ohno et al. .................. 428/141 |
| 6,048,608 A | 4/2000 | Peet et al. ................ 428/315.5 |
| 6,074,747 A | 6/2000 | Scholz et al. ............... 428/352 |
| 6,086,987 A | 7/2000 | Yamanaka et al. .......... 428/330 |
| 6,194,506 B1 | 2/2001 | Ochiai et al. ............... 524/436 |
| 6,331,343 B1 | 12/2001 | Perez et al. ................. 428/141 |
| 2002/0146520 A1 * | 10/2002 | Squier et al. .............. 428/34.1 |

\* cited by examiner

Primary Examiner—D. Lawrence Tarazano
(74) Attorney, Agent, or Firm—Rick F. James

(57) ABSTRACT

A thermoplastic film label composite that includes an outer skin layer that has a printable, untreated, cavitated surface which may be utilized for printing and affixing the label to a substrate. The invention further provides a film label composite printed on both its front- and back-side, and a method of manufacturing the same.

34 Claims, 3 Drawing Sheets

THERMOPLASTIC FILM LABEL COMPOSITE WITH A PRINTABLE, UNTREATED, CAVITATED SURFACE

BACKGROUND OF THE INVENTION

1. Field of the Invention

The present invention relates to a thermoplastic film label composite that has a printable, untreated, cavitated surface and a method of making such label composites. In particular, the untreated, cavitated surface provides a stable print medium that exhibits excellent printability properties, without sacrificing initial adhesion or fiber tear.

2. Description of Related Art

In the packaging industry, it is desirable to place a label on a packaging material to either advertise and promote the product therein, or to simply identify the ingredients thereof. Throughout the years, a number of label stock materials have been used, ranging from paper to polymeric label stock materials.

Polymeric label stock materials have been found to be particularly attractive because they provide certain characteristics missing in paper labels. These characteristics include: durability, strength, water resistance, curl resistance, abrasion resistance, gloss, transparency, etc.

Polymeric label stock materials must meet a number of commercial and manufacturing requirements. They must be economical and suitable for manufacturing processes, such as cast film extrusion or blown film extrusion. For example, a formed film material must be capable of hot-stretching without deleterious effect. In this regard, it is generally advantageous to hot-stretch and anneal a formed film, so as to biaxially orient the film and impart a stiffness to it that is different in the machine and transverse directions.

Preferred polymeric label stock materials generally have a printable face or front-side (the face or front-side being the side of the label opposite to and not in direct contact with the substrate), and are die-cuttable, as well as matrix-strippable when used in a pressure-sensitive label construction. Upon die-cutting, the labels can be applied to a substrate via, e.g., a pressure-sensitive label. Cold glue adhesives are viewed as an economical alternative to pressure-sensitive labels that can be suitable for cut-and-stack applications. A label adhered to a substrate with a cold glue adhesive provides good initial adhesion, while minimizing visual defects.

Olefins, including olefin blends, are examples of polymeric materials that may be employed to meet the demands of polymeric, die-cut label manufacture. The relatively low cost of olefinic resins, coupled with their high strength that allows for low-caliper film, tends to minimize overall material cost. For example, hot-stretched polypropylene and/or polyethylene provides sufficient stiffness in the machine direction, even at a relatively low-caliper thickness, for adequate print registration and dispensing. Further, hot-stretched polypropylene and/or polyethylene provides sufficiently low tensile modulus and, in particular, sufficiently high elongation in the transverse direction for conformability.

Oriented cavitated film compositions are generally known in the art. For example, U.S. Pat. No. 4,632,869 discloses an opaque, biaxially oriented film structure having a polymer matrix with a strata of voids, the voids containing spherical void-initiating particles of polybutylene terephthalate. The structure may also include thermoplastic skin layers, and the film can include from about 1% to 3% by weight of a pigment such as $TiO_2$ or colored oxides.

U.S. Pat. No. 4,741,950 discloses a differential opaque polymer film with a core layer containing numerous microscopic voids, a rough-appearing wettable first skin layer which contains an antiblocking agent such as silica, silicate, clay, diatomaceous earth, talc and glass, and a second wettable skin layer with a smooth appearance which may be metallized. $TiO_2$ may be present in the core and/or first skin layer. The film allows a light transmission of 24%.

U.S. Pat. No. 5,176,954 discloses a non-symmetrically layered, highly opaque, biaxially oriented polymer film with a core containing numerous microscopic voids and at least about 1% by weight of opacifying compounds; a first skin layer on one surface of the core containing up to about 12% by weight of inorganic particulate material; and a second skin layer on the other surface of the core. The '954 patent also discloses the benefit which accrues from the addition of inorganic particles such as titanium dioxide to whiten the surface of the outer skin layer of the film structure. The increase in whiteness yields an excellent surface for printed graphics. A further benefit resulting from increased whiteness in the outer skin layer of the film is that it permits the printing of laminated or unlaminated film structures without the need for white ink, offering a significant savings to the end user.

In addition, a number of films with ink-retention properties have been developed. For example, U.S. Pat. No. 6,331,343 describes an oriented film that has at least one fibrous surface. The film includes a melt-processed, immiscible mixture of a semicrystalline polymer component and a void-initiating component. The fibrous surface provides the film with a surface area that renders the film useful in applications such as ink-receptive substrates, wipes, paper-like films and as backings for tape. The '343 patent is hereby incorporated by reference in its entirety.

U.S. Pat. No. 6,194,506 discloses a polyolefinic resin film that has a calcium carbonate dispersed therein to act as nuclei forming microvoids in the polyolefin film. Thus, the film is rendered with a specific oil absorption. The '506 patent is hereby incorporated by reference in its entirety.

U.S. Pat. No. 6,086,987 discloses a synthetic paper made of a stretched resin film obtained by stretching a resin film having as a support a resin composition containing (a) from 30–80% by weight of crystalline polyolefin resin and (b) from 70–20% by weight of milled calcium carbonate particles at a temperature lower than the melting point of the crystalline polyolefin. The '987 patent is hereby incorporated by reference in its entirety.

U.S. Pat. No. 6,074,747 discloses an ink-printable release coating composition including a substrate having a pressure-sensitive adhesive on a back surface and an ink-printable cured release coating on the face surface. The release coating includes a polymer selected from the group consisting of silicones, fluoroacrylates and polyurethane polymers; and resin particles that are different from the polymer to release any abutting materials without ruining the print thereon. The '747 patent is hereby incorporated by reference in its entirety.

U.S. Pat. No. 5,667,872 discloses a synthetic paper with a multilayer structure including a biaxially stretched film of an olefinic polymer having a melting point of 130° C. to 210° C. containing 5 to 40% by weight of inorganic fine powder as a base material. Adhered to at least one surface of the base material is a uniaxially stretched layer of a propylene-α-olefin copolymer having a melting point at least 5° C. lower than the melting point of the base material and from 8 to 65% by weight of inorganic compound. The '872 patent is hereby incorporated by reference in its entirety.

Co-pending U.S. Ser. Nos. 09/770,960 and 10/098,806 disclose labels for use with cold glue. They fail to disclose an untreated, cavitated skin layer that serves the dual role of a printing and laminating surface.

There are disadvantages, however, associated with prior art thermoplastic film label composites. They can be far too complex, including, for example, the formation of fibrous surfaces and/or the need for secondary operations. Examples of needed secondary operations include operations designed to attain a suitable ink-retention property, such as annealing or surface treatments, such as ozone, corona discharge, and plasma.

A further disadvantage associated with prior art thermoplastic film label composites is that they are not designed to be printed on their reverse side, i.e., their back-side, where the advertisement or promotion may be observed through the packaging material, e.g., through a transparent bottle of polyethylene terepthalate (PET) or glass, or where the advertisement or promotion, e.g., coupon or game piece, may be observed upon removing the film label composite from an opaque packaging material.

SUMMARY OF THE INVENTION

An object of the present invention is to provide a novel thermoplastic film label composite with a printable, untreated cavitated surface that meets the requirements of the packaging industry and overcomes the disadvantages of the prior art. In particular, the untreated, cavitated surface provides a stable print medium that exhibits excellent printability properties, without sacrificing initial adhesion or fiber tear when laminated to a substrate.

A further object of the invention is to provide a novel thermoplastic film label composite that has a printed image on both the front-side and back-side of the label. Thus, in addition to the typical image on the front-side of the label that, e.g., promotes the product therein, there may be provided, e.g., an advertising logo, promotion, coupon, game piece or ingredient list on the back-side of the label that can be viewed through the packaging material, e.g., through a transparent bottle. Alternatively, a coupon or game piece may be printed on the back-side of the label so that it can be viewed when the label is removed from, e.g., an opaque container, in, e.g., a hot-melt adhesive application.

A still further object of the invention is to provide a method of manufacturing the novel thermoplastic film label composite.

There is provided a thermoplastic film label composite, including at least:
(a) a base layer comprising a thermoplastic polymer, wherein the base layer has a first side and a second side; and
(b) a first skin layer comprising a thermoplastic polymer and a cavitating agent, wherein the first skin layer has a first side and a second side, and the first skin layer is untreated.

The base layer may also comprise a cavitating agent. In addition, the thermoplastic film label composite may be laminated at the first skin layer to a substrate by employing an adhesive therebetween. Prior to laminating the thermoplastic film label composite at the first skin layer to a substrate, the first skin layer may have an image printed thereon.

There is also provided a method of manufacturing the thermoplastic film label composite, including at least the steps of:
(i) coextruding melts corresponding to the individual layers of the film label composite to form a coextruded sheet;

(ii) casting the coextruded sheet;
(iii) quenching the coextruded sheet; and
(iv) orienting the coextruded sheet to form a film.

The thermoplastic film label composite may be manufactured (i) with a second skin layer on a side of the base layer opposite the first skin layer, (ii) with one or more tie layers between the base layer and the first skin layer, and/or (iii) with one or more tie layers between the base layer and the second skin layer (if any). The second skin layer may be surface-treated, metallized, and/or coated. The second skin layer may also have an image printed thereon.

DETAILED DESCRIPTION OF THE INVENTION

The invention will be described with reference to accompanying FIGS. 1–4. It will be understood by those skilled in the art that the description below and FIGS. 1–4 illustrate various embodiments of the invention without limiting the invention to the illustrated embodiments.

Figure 1:
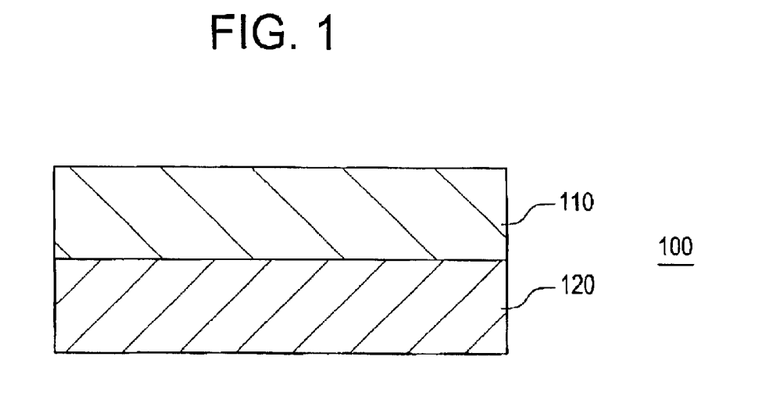
FIG. 1 is a section view of a thermoplastic film label composite according to the present invention comprising a base layer and first skin layer.

FIG. 1 illustrates a thermoplastic film label composite 100 according to an embodiment of the present invention. Film label composite 100 is provided with a base layer 110 and a first skin layer 120, each of which have a first surface and a second surface.

Base layer 110 comprises a polymeric matrix comprising a thermoplastic polymer, and preferably a thermoplastic polymer suitable for extrusion and/or blown-film extrusion operations. A polyolefin having a melting point of from about 302° F. (150° C.) through about 332.6° F. (167° C.) represents one example of a thermoplastic polymer suitable for forming the polymeric matrix of base layer 110.

If the thermoplastic polymer of base layer 110 is a polyolefin, the polyolefin preferably has a relatively high degree of crystallinity. A particularly desirable polyolefin is an isotactic propylene homopolymer having (i) an isotacticity of from about 89 to 99%, (ii) a melting point of from about 311° F. (155° C.) to about 329° F. (165° C.), and (iii) a melt index of from about 0.5 to about 15 g/10 minutes (as measured according to ASTM D1238). The isotactic propylene polymer may be produced by using Ziegler-Natta or metallocene catalysts. Metallocene-catalyzed isotactic polypropylenes made developmentally or commercially are EOD 96-21 and EOD 97-09, from Fina Oil and Chemical Co., EXPP-129, from ExxonMobil Chemical Co., and Novalen M, from BASF GmbH., among others.

It will be understood by one of ordinary skill in the art that an isotactic propylene homopolymer that has an isotacticity of from about 89 to 99% may be considered either a so-called standard, film-grade isotactic polypropylene or a highly crystalline polypropylene. Standard, film-grade isotactic polypropylene has an isotactic stereoregularity of from about 89% to about 93%. Highly crystalline polypropylene (HCPP) has an isotactic stereoregularity greater than about 93%. HCPP exhibits higher stiffness, surface hardness, lower deflection at higher temperatures and better creep properties than standard, film-grade isotactic polypropylene. Further information relating to HCPP, including methods for preparation thereof, is disclosed in U.S. Pat. No. 5,063,264, incorporated herein by reference. Commercially available HCPPs include Amoco 9117 and Amoco 9119 (available from Amoco Chemical Co. of Chicago, Ill.), and Chisso HF5010 and Chisso XF2805 (available from Chisso Chemical Co., Ltd. of Tokyo, Japan). Suitable HCPPs are also available commercially from Solvay in Europe.

For purposes of the present invention, stereoregularity can be determined by IR spectroscopy according to the procedure set out in "Integrated Infrared Band Intensity Measurement of Stereoregularity in Polypropylene," J. L. Koenig and A. Van Roggen, Journal of Applied Polymer Science, Vol. 9, pp. 359–367 (1965) and in "Chemical Microstructure of Polymer Chains," Jack L. Koenig, Wiley-Inerscience Publication, John Wiley and Sons, New York, Chichester, Brisbane, Toronto. Alternatively, stereoregularity can be determined by decahydronaphthalene (decalin) solubility or nuclear magnetic resonance spectroscopy (NMR), e.g., $^{13}C$ NMR spectroscopy using meso pentads.

In certain embodiments wherein base layer 110 comprises a propylene homopolymer, there may be added to base layer 110 from 0.0002 to 8 wt %, based on the weight of polypropylene, more preferably from 0.005 to 2 wt %, e.g., from 0.01 to 2 wt %, of a beta nucleator. Any type of beta nucleator may be employed, including two-component beta nucleators. Alternatively, a base layer of a thermoplastic film label composite according to the present invention may not comprise any beta-nucleator.

Other suitable thermoplastic polymers that may be used to form the polymeric matrix of base layer 110 include, but are not limited to, syndiotactic polypropylene, propylene-olefin copolymers, including ethylene-propylene copolymers, propylene-olefin terpolymers including ethylene-propylene-butene-1 terpolymers, butylene-ethylene copolymers, ethylene copolymers such as ethylene-vinyl acetate and ethylene-vinyl alcohol copolymers, nylons, polymers grafted with functional groups (including, but not limited to, maleic and himic anhydride), blends of any of the foregoing polymers, etc.

Although it is preferred for base layer 110 to comprise a polymeric matrix comprising any of the propylene homopolymers, copolymers, or terpolymers described above, in an alternative embodiment, the polymeric matrix of base layer 110 comprises an ethylene resin, such as a high density polyethylene (HDPE), medium density polyethylene (MDPE), low density polyethylene (LDPE), very low density polyethylene (VLDPE), linear low density polyethylene (LLDPE), or ethylene plastomer.

HDPE is a substantially linear polyolefin having a density of, for example, from about 0.95 g/cm$^3$ or higher, e.g., from about 0.952 g/cm$^3$ to about 0.970 g/cm$^3$, and a melting point of, for example, from about 266° F. to about 299° F. (from about 130° C. to about 148° C.).

MDPE has a density in the range of from about 0.926 g/cm$^3$ to about 0.940 g/cm$^3$.

LDPE typically has a density in the range of from 0.90 g/cm$^3$ to 0.94 g/cm$^3$, e.g., from 0.910 g/cm$^3$ to 0.926 g/cm$^3$, and a melt index of from less than 1 to 10 g/10 min (as measured according to ASTM D1238). LDPE may be derived solely from ethylene, e.g., in a high pressure, peroxide-catalyzed reaction, or from ethylene together with a comonomer, including but not limited to higher olefin comonomers containing 4 to 10 carbon atoms, e.g., butene-1, hexene-1, or octene-1, e.g., in a gas phase linear low density polyethylene (LLDPE) process or in a solution LLDPE process using Ziegler-Natta, metallocene, or single-site catalysts.

LLDPE typically has: a melt index of from less than 1 to 10 g/10 min (as measured according to ASTM D1238) and a density in the range of from 0.88 to 0.94 g/cm$^3$, preferably from 0.89 to 0.92 g/cm$^3$. It may be derived from ethylene together with other higher comonomers, such as butene-1, hexene-1 or octene-1.

VLDPE, which is sometimes referred to as ultra low density polyethylene (ULDPE), is a very low density polyethylene typically having a density at or below 0.915 g/cm$^3$, e.g., from about 0.86 to about 0.915 g/cm$^3$. VLDPE is typically produced in a high pressure, peroxide-catalyzed reaction or in a solution process. When produced using a metallocene or single-site catalyst, VLDPE is commonly referred to as a type of plastomer.

In an embodiment of the invention, a first cavitating agent may be dispersed within the polymeric matrix of base layer 110. As used herein, the term "cavitating agent" includes any organic or inorganic material that is incompatible with (the term "incompatible" is used in the sense that the materials are two distinct phases), and has a higher melting point or glass transition temperature than, a thermoplastic polymer of the base layer, at least at an orientation temperature thereof.

The first cavitating agent may be dispersed within the polymeric matrix of base layer 110 by any method of the art, including blending the first cavitating agent and the thermoplastic polymer that provides the polymeric matrix at a temperature above the melting point of the thermoplastic polymer. This blending may take place in, e.g., an extruder, including a single-screw extruder and a corotating, intermeshing twin screw extruder. When base layer 110 comprising a first cavitating agent is subjected to uniaxial or biaxial orientation, a cavity forms.

As an example, the first cavitating agent may be any of those described in U.S. Pat. Nos. 4,377,616 and 4,632,869, the entire disclosures of which are incorporated herein by reference. Other, more specific examples of the first cavitating agent include polybutylene terephthalate (PBT), nylon, an acrylic resin, an ethylene-norborene copolymer, solid or hollow preformed glass spheres, metal beads or spheres, ceramic spheres, calcium carbonate, COC's and combinations thereof. COC's (cyclic olefin polymers and cyclic olefin copolymers) are described in U.S. Pat. No. 6,048,608; this patent is incorporated herein by reference in its entirety.

The first cavitating agent may be of any desired shape. For example, the first cavitating agent may be substantially spherical. The first cavitating agent may be present in base layer 110 in an amount of $\leq 35$ wt %, for example from 2 wt % to 25 wt %, e.g., from 5 wt % to 10 wt %, based on the total weight of the base layer.

Although individual particles of the first cavitating agent may have a broad range, e.g., from about 0.1 $\mu$m to about 10 $\mu$m, the first cavitating agent preferably has a relatively small mean particle size (a mean particle size may be determined with a sedigraph, which measures the volume of particles settling through different diameter sieves). In particular, a preferred first cavitating agent has a mean particle size of from about 0.5 to about 2.5 μm, with individual particle sizes as large as 6–8 μm.

Examples of commercially available cavitating agents that may be employed as the first cavitating agent include CELANEX 1300A, available from Ticona, and PEARL 2, available from Ampacet. CELANEX 1300A is a polybutyleneterephthalate (PBT) that when mixed with molten polypropylene, e.g., Fina 3371 propylene homopolymer, forms particles of spherical shape that have a mean particle size of from 1 to 3 μm. Pearl 2 is a masterbatch of polypropylene and calcium carbonate ($CaCO_3$). The particles of $CaCO_3$ in PEARL 2 are irregular in shape, with a mean particle size of 1.5 μm.

Base layer 110 may also comprise an opacifying agent. Examples of the opacifying agent include iron oxide, carbon black, titanium dioxide, talc, and combinations thereof. The opacifying agent may be present in base layer 110 in an amount of from 1 to 25 wt %, for example from 1 to 8 wt %, e.g., from about 2 to about 4 wt %, based on the total weight of the base layer. Aluminum is another example of an opacifying agent that may be used in base layer 10 of the present film label composite. Aluminum may be included in base layer 110 as an opacifying agent in an amount of from 0.01 to 1.0 wt %, e.g., from about 0.25 to about 0.85 wt %, based on the total weight of the base layer.

Still referring to FIG. 1, a first skin layer 120 is disposed on a first surface of base layer 110, such that the second surface of first skin layer 120 is adjacent to the first surface of base layer 110.

First skin layer 120 comprises a polymeric matrix comprising a thermoplastic polymer. The thermoplastic polymer of first skin layer 120 may be selected from any of the thermoplastic polymers discussed above in connection with base layer 110. For example, first skin layer 120 may comprise a polymeric matrix comprising a polypropylene, e.g., a highly crystalline polypropylene (HCPP), or a high density polyethylene. In some embodiments of the present invention, the same thermoplastic polymer will be employed in first skin layer 120 and base layer 110.

Regardless of the thermoplastic polymer(s) chosen for first skin layer 120, a second cavitating agent is dispersed within the polymeric matrix of first skin layer 120. The second cavitating agent may be dispersed within the polymeric matrix of first skin layer 120 by any method of the art, including the techniques discussed earlier in connection with dispersing the first cavitating agent within the polymeric matrix of base layer 110. The second cavitating agent may be any of the cavitating agents discussed earlier as candidates for the first cavitating agent. The second cavitating agent may be of any desired shape. For example, the second cavitating agent may be substantially spherical.

Preferably, the first cavitating agent and the second cavitating agent are not the same, and at least differ in their particle size and in the amount in which they are present in their respective layers. For example, whereas a preferred first cavitating agent has a mean particle size of from about 0.5 to about 2.5 μm, with individual particle sizes as large as 6–8 μm, a preferred second cavitating agent has a mean particle size of from about 1 to about 3 μm, with individual particle sizes as large as 10 μm. Furthermore, whereas the first cavitating agent may be present in base layer 110 in an amount of ≦35 wt %, for example from 2 wt % to 25 wt %, e.g., from 3 wt % to 10 wt %, based on the total weight of the base layer, the second cavitating agent may be present in first skin layer 120 in an amount of ≧8 wt %, for example from 8 wt % to 60 wt %, e.g., from 15 wt % to 50 wt %, based on the total weight of the first skin layer.

An example of a commercially available cavitating agent that may be employed as the second cavitating agent is Pearl 70, available from Ampacet. Pearl 70 is in the form of a masterbatch of polypropylene and calcium carbonate ($CaCO_3$). The particles of $CaCO_3$ in Pearl 70 are irregular in shape, with a mean particle size of 2.0 microns and individual particles as large as 10 μm.

Figure 2:
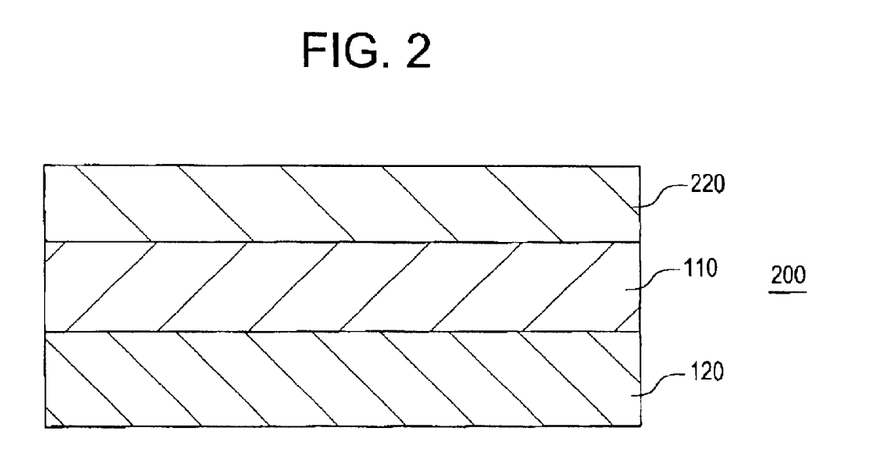
FIG. 2 is a section view of the thermoplastic film label composite of FIG. 1 further comprising a second skin layer disposed on a side of the base layer opposite the first skin layer.

FIG. 2 illustrates a thermoplastic film label composite 200 according to a different embodiment of the present invention. Film label composite 200 is provided with a base layer 110, a first skin layer 120, and a second skin layer 220, wherein each of base layer 110, first skin layer 120, and second skin layer 220 have a first surface and a second surface. The second surface of first skin layer 120 is adjacent to the first surface of base layer 110, and the second surface of base layer 110 is adjacent to the first surface of second skin layer 220.

Second skin layer 220 comprises a polymeric matrix comprising a thermoplastic polymer. The thermoplastic polymer of second skin layer 220 may be selected from any of the thermoplastic polymers discussed above in connection with base layer 110 or first skin layer 120. For example, second skin layer 220 may comprise a polymeric matrix comprising a propylene homopolymer, copolymer or terpolymer, e.g., an ethylene-propylene copolymer or an ethylene-propylene-butene-1 terpolymer. In some embodiments of the present invention, the thermoplastic polymer of second skin layer 220 may be the same as one or both of the thermoplastic polymer of base layer 110 and the thermoplastic polymer of first skin layer 120.

In a particular embodiment of the invention, a cavitating agent may be dispersed within the polymeric matrix of second skin layer 220. The cavitating agent may be dispersed within the polymeric matrix of second skin layer 220 by any method of the art, including the techniques discussed earlier in connection with dispersing the first cavitating agent within the polymeric matrix of base layer 110. The cavitating agent employed in second skin layer 220 may be any of the cavitating agents discussed earlier as candidates for either of the first or second cavitating agent. The cavitating agent employed in second skin layer 220 may have a mean particle size (and individual particle sizes) as described earlier in connection with either of the first or second cavitating agent, and it may be present in second skin layer 220 in an amount such as that described earlier for either of the first cavitating agent in base layer 10 or the second cavitating agent in first skin layer 120.

Figure 3:
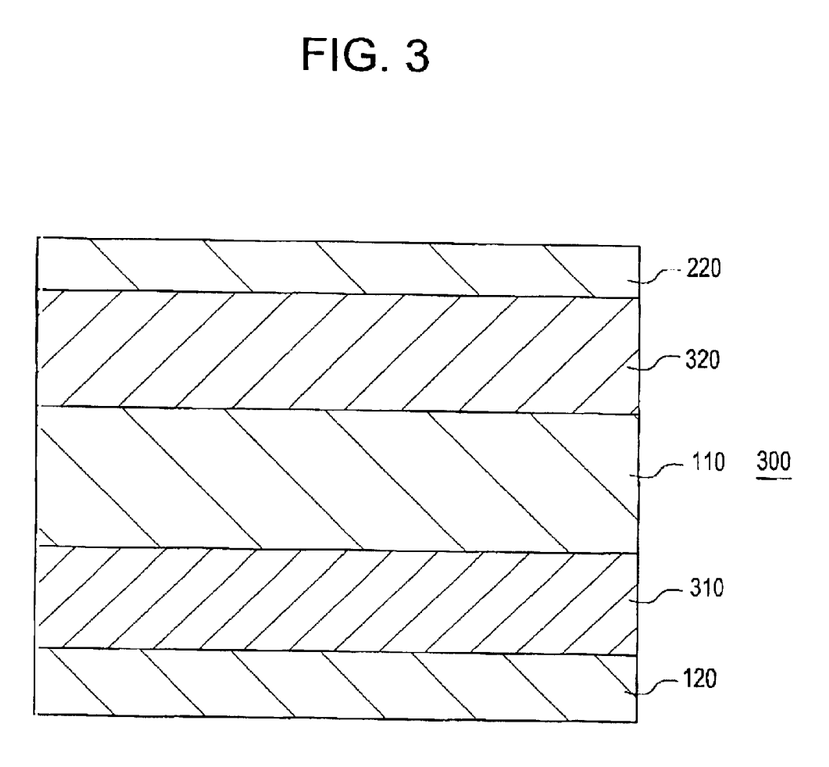
FIG. 3 is a section view of the thermoplastic film label composite of FIG. 2 further comprising a tie layer disposed between each of the base layer and first skin layer and the base layer and second skin layer.

FIG. 3 illustrates a thermoplastic film label composite 300 according to a particularly preferred embodiment of the present invention. Film label composite 300 is provided with a base layer 110, a first tie layer 310, a first skin layer 120, a second tie layer 320 and a second skin layer 220, wherein each of base layer 110, first tie layer 310, first skin layer 120, second tie layer 320 and second skin layer 220 have a first surface and a second surface. The second surface of first skin layer 120 is adjacent to the first surface of first tie layer 310, the second surface of first tie layer 310 is adjacent to the first surface of base layer 110, the second surface of base layer 110 is adjacent to the first surface of second tie layer 320, and the second surface of second tie layer 320 is adjacent to the first surface of second skin layer 220.

First tie layer 310 and second tie layer 320 each comprise a polymeric matrix comprising a thermoplastic polymer. The thermoplastic polymer of first tie layer 310 and second tie layer 320 may be independently selected from any of the thermoplastic polymers discussed above in connection with base layer 110, first skin layer 120, or second skin layer 220. For example, first tie layer 310 and second tie layer 320 may each comprise a polymeric matrix comprising a propylene homopolymer. Alternatively, the polymeric matrix of first tie layer 310 may comprise a propylene homopolymer, whereas the polymeric matrix of second tie layer 320 may comprise high density polyethylene (HDPE), or vice versa. In some embodiments of the present invention, the thermoplastic polymers of first tie layer 310 and second tie layer 320 may be the same as one or each of the thermoplastic polymers of base layer 110, first skin layer 120, and second skin layer 220.

Of course, FIG. 3 illustrates just one embodiment of a film label composite comprising tie layers. Alternatively, a film label composite may comprise (i) a first tie layer 310, but not a second tie layer 320, and vice versa, (ii) more than one tie layer between first skin layer 120 and base layer 110, and/or (iii) more than one tie layer between second skin layer 220 and base layer 110.

In a particular embodiment of the invention, a cavitating agent may be dispersed within the polymeric matrix of one or both of first tie layer 310 and second tie layer 320. The cavitating agent may be dispersed by any method of the art, including the techniques discussed earlier in connection with dispersing the first cavitating agent within the polymeric matrix of base layer 110. The cavitating agent employed in first tie layer 310 and second tie layer 320 may be independently selected from any of the cavitating agents discussed earlier as candidates for either of the first or second cavitating agent. The cavitating agent employed in first tie layer 310 or second tie layer 320 may have a mean particle size (and individual particle sizes) as described earlier in connection with either of the first or second cavitating agent, and it may be present in first tie layer 310 or second tie layer 320 in an amount such as that described earlier for either of the first cavitating agent in base layer 110 or the second cavitating agent in first skin layer 120.

Although the thickness of the film label composite, and the thicknesses of the individual layers of the film label composite, are not critical, in certain embodiments, the film label composite has a total thickness ranging from about 0.2 mil to about 5 mils optical gauge, preferably from about 0.4 mil to about 2.5 mils. The thickness of the base layer preferably ranges from about 50% to about 99%, the thickness of each tie layer, if any, preferably independently ranges from 0% to 25%, and the thickness of the skin layer(s) preferably independently ranges from 1% to 15%, wherein, for each case, the example range is based on the entire thickness of the film label composite. In a preferred embodiment, second skin layer 220 is from about 1.5 to about 4 poly gauge units (100 gauge units=1 mil=25.4 μm); first tie layer 310 and second tie layer 320 are independently from about 5 to about 35 gauge units; base layer 110 is from about 90 to about 100 gauge units; and first skin layer 120 is from about 8 to about 15 gauge units.

In order to modify or enhance certain properties of the film label composite for specific end-uses, it is possible for one or more of the layers to contain appropriate additives in effective amounts. As will be readily understood by one of ordinary skill in the art, an "effective amount" is an amount sufficient to achieve the desired effect, e.g., an antiblocking effect for antiblock additives or an antistatic effect for antistatic additives. Preferred additives include, but are not limited to anti-blocks, anti-static agents, coefficient of friction (COF) modifiers, processing aids, pigments, colorants, clarifiers, antioxidants, waxes, and other additives known to those skilled in the art.

A film label composite according to the present invention may be manufactured by a method that includes the steps of (i) coextruding melts corresponding to the individual layers of the film label composite, including base layer 110, first skin layer 120, and, optionally, one or more of second skin layer 220, first tie layer 310, second tie layer 320, and any other tie layer, through, e.g., a flat sheet extruder die at a temperature that may range from 200° C. to 250° C. to form a coextruded sheet, (ii) casting the coextruded sheet onto, e.g., a cooling drum, and (iii) quenching the coextruded sheet. As an alternative to coextrusion, melts corresponding to individual layers of the film label composite may be individually extruded (i), cast (ii), and quenched (iii), before being laminated together to form a sheet.

The sheet (whether coextruded or laminated) may then be reheated and oriented to form a film, surface-treated, metallized, and/or coated. The film may be printed on one or both of its outermost surfaces (front-side and back-side), e.g., on one or both of the second surface of second skin layer 220 and the first surface of first skin layer 120. The film may be die-cut and may have one or both of its outer surfaces laminated to a substrate.

The orientation may be uniaxial or biaxial orientation. In a preferred embodiment, a coextruded sheet is formed into a film label composite according to the invention by stretching it from 3 to 7 times, e.g., from 4.5 to 5.5 times, in the machine direction (MD) and from 5 to 10 times, e.g., from 8 to 10 times, in the transverse direction (TD).

A film label composite according to the present invention may have its outermost surface that is opposite the first skin layer surface-treated. For example, the second surface of second skin layer 220 of film label composite 300 may be surface-treated. The surface-treatment may be carried out by any method of the art, including, but not limited to, corona discharge treatment, flame treatment, or plasma treatment. The surface-treatment may be carried out in-line, i.e., after orientation, or post-process, e.g., at a converter. The outermost surface may be treated to a surface tension level of at least about 35 dynes/cm, e.g. from about 38 to 55 dynes/cm, in accordance with ASTM Standard D2578-84. Preferably, the first surface of the first skin layer, i.e., the first surface of first skin layer 120, is not surface-treated according to the present invention.

A film label composite according to the present invention may have its outermost surface that is opposite the first skin layer metallized. For example, the second surface of second skin layer 220 of film label composite 300 may be metallized. Application of a metal coating layer may be accomplished by vacuum deposition, or any other metallization technique, such as electroplating or sputtering. The metal of the metal coating layer may be aluminum, or any other metal capable of being vacuum deposited, electroplated, or sputtered, such as, for example, gold, zinc, copper, or silver. The thickness of the deposited metal coating may be from about 5 to about 200 nanometers (nm), for example, from about 10 to 100 nm, e.g. from about 30 to about 80 nm. Preferably, the outermost surface is surface-treated prior to metallization to maximize the adhesion of the deposited metal layer to the outer surface.

When the cavitating agent to be dispersed in the base layer, i.e., the first cavitating agent, has a mean particle size of from about 0.5 to about 2.5 μm, with individual particle sizes as large as 6–8 μm, the appearance of the metallized outermost surface, e.g., the metallized second surface of second skin layer 220 of film label composite 300, tends to be bright, highly reflective and mirrored. On the other hand, when the first cavitating agent has a relatively large size, e.g., a mean particle size of about 2.5 µm or more, the metallized outermost surface tends to be less reflective and less mirrored.

A film label composite according to the present invention may have its outermost surface that is opposite the first skin layer coated. For example, the second surface of second skin layer 220 of film label composite 300 may be coated. The coating may be applied directly on the outermost surface, on the surface-treated outermost surface, on the metallized outermost surface, or on a primer on the outermost surface.

Examples of coatings that may be employed include, but are not limited to, acrylic coatings, such as those described in U.S. Pat. Nos. 3,753,769 and 4,865,908, both of which are incorporated herein by reference, acrylonitrile coatings, polyvinylidene chloride (PVdC) coatings such as those described in U.S. Pat. Nos. 4,214,039, 4,447,494, 4,961,992, 5,019,447 and 5,057,177, all of which are incorporated herein by reference, and a vinyl alcohol polymer coating, such as VINOL 325 available from Air Products, Inc. An appropriate primer includes, but is not limited to, a poly (ethyleneimine) primer and an epoxy primer.

The coating may be applied in an amount such that there will be deposited upon drying a smooth, evenly distributed layer, generally on the order of from about 0.01 to about 1 mil thickness. The coating may be dried by hot air, radiant heat or by any other convenient means.

A film label composite according to the present invention may have an image printed on one or both of its outermost surfaces, e.g., on one or both of the second surface of second skin layer 220 and the first surface of first skin layer 120. In other words, the film label composite may have an image printed on one or both of its front-side and back-side. Maximizing the opacity of the film label composite maximizes the visual separation between the image printed on the front-side and the image printed on the back-side. The opacity of the film label composite may be adjusted by varying the amount of cavitating agent and/or opacifying agent therein.

The outermost surface(s) of the film label composite may be printed by any means, including, but not limited to, letterpress, offset, silk screen, electrostatic and photographic methods. More specific examples of printing methods include thermal dye transfer (including dye sublimation), lithographic printing, flexographic printing, gravure printing, hot stamping, valley printing, roll-leaf printing and spanishing.

Printing inks that may be employed include, but are not limited to, flexo, gravure such as rotogravure, litho, water- and solvent-based, as well as inkjet and hot-melt types.

Regarding an image printed on the front-side, it may be printed, e.g., directly on the second surface of second skin layer 220, on the surface-treated second surface of second skin layer 220, on the metallized second surface of second skin layer 220, or on the coated second surface of second skin layer 220.

Regarding an image printed on the back-side, i.e., an image printed on the first surface of first skin layer 120, it is noted that the back-side is preferably not surface-treated according to the present invention. One reason the back-side may be left untreated is because the cavitated first skin layer, i.e., first skin layer 120, eliminates the need to use surface-treatment to impart an ink-retention property thereto. Specifically, it was an unexpected surprise when the untreated back-side exhibited excellent printability properties, such as little to no color bleed and fairly sharp images. It was even more of a surprise when these excellent properties were observed not only with solvent-based inks, but also water-based inks. Typically, poor ink adhesion and appearance render water-based inks non-functional with an untreated thermoplastic polymer, such as the polyolefins that are preferred for use in the first skin layer of the present invention.

While not wanting to be bound by any particular theory, the inventors believe that the particle size of the cavitating agent employed in the first skin layer, i.e., the particle size of the second cavitating agent, affects the appearance of the back-side print surface. Specifically, the smaller the mean particle size of the second cavitating agent, the smoother the surface of the first skin layer and the sharper the image that can be developed on the first skin layer.

A film label composite according to the present invention may have one or both of its outer surfaces laminated to a substrate. For example, the second surface of second skin layer 220 of film label composite 300 may be laminated to a protective substrate, such as a polymer film, e.g., a monolayer or multilayer polymer film, and the first surface of first skin layer 120 of film label composite 300 may be laminated to a packaging material, e.g., a transparent glass or plastic bottle. In a particular embodiment, printed matter may be provided to the front-side, e.g., the second surface of second skin layer 220, by laminating a polymer film containing a printed layer to the front-side. Preferably, the first surface of the first skin layer, e.g., the first surface of first skin layer 120, is laminated to a substrate, and preferably, the substrate is a transparent packaging material.

Examples of substrates other than a separate polymer film or bottle include, but are not limited to, a metal foil, such as aluminum foil; cellulosic webs, e.g., numerous varieties of paper such as corrugated paperboard, craft paper, glassine, and cartonboard; nonwoven tissue, e.g., spunbonded polyolefin fiber and melt-blown microfibers; etc.

Lamination to a substrate may be accomplished with a suitable adhesive. Alternatively, lamination, especially lamination of the second skin layer to a separate polymer film, may be accomplished via extrusion lamination using, e.g., a polyethylene or ethylene co- or terpolymer. In a preferred embodiment of the invention, illustrated by FIG. 4, the first surface of first skin layer 120, is laminated to a substrate 420, e.g., a transparent packaging material, such as a bottle, with a cold glue adhesive 410, and the second surface of second skin layer 220 is not laminated to a substrate.

Figure 4:
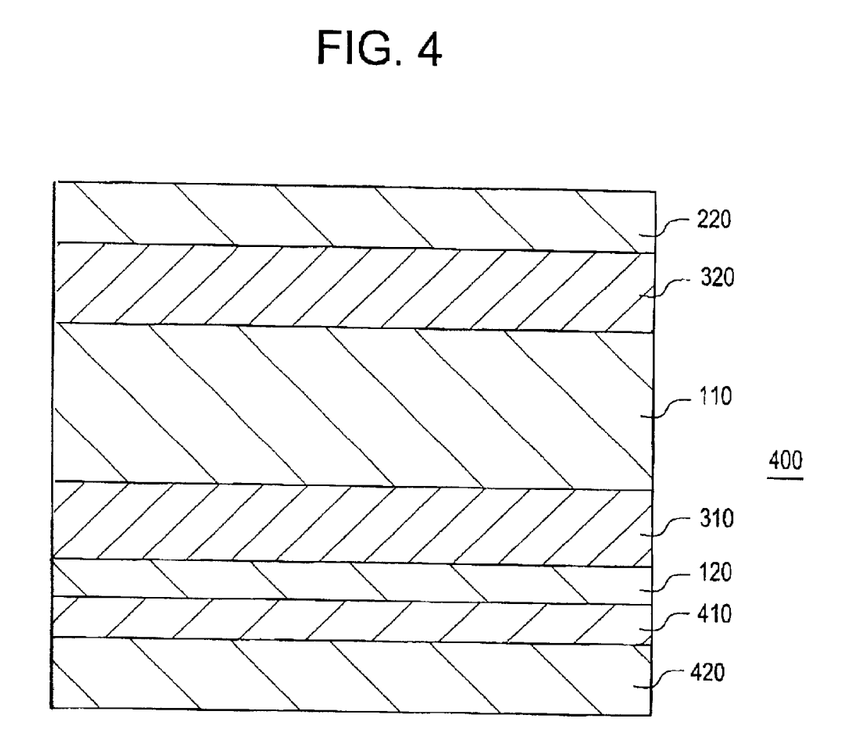
FIG. 4 is a section view of the thermoplastic film label composite of FIG. 3 attached to a packaging material via a cold glue adhesive.

Cold glue adhesives generally consist of solid base materials in combination with water. For example, cold glue adhesive 410 may be an aqueous solution of a natural adhesive, e.g., casein. As another example, cold glue adhesive 410 may be an aqueous solution of a resin, e.g., poly(vinyl acetate) (PVA) or ethylene-vinyl acetate (EVA). Cold glue adhesives are widely used as an economical alternative to hot-melt wrap-around or pressure-sensitive labels. Some cold glue adhesives are a colloidal suspension of various proteinaceous materials in water and are derived by boiling animal hides, tendons, or bones which are high in collagen. Alternatively, cold glue adhesive 410 may be derived from vegetables, e.g., starch or dextrin. Examples of commercially available cold glue adhesives that are suitable for the invention include WB 5020 from HB Fuller, Cycloflex 14-200A from National Starch, 712-150 from AABBITT, and 10-7026 from Henkel.

In a particularly preferred embodiment of the invention, film label composite 400 is laminated to transparent substrate 420, e.g., a packaging material, as follows. Film label composite 400, prepared according to the present invention, comprises second skin layer 220, second tie layer 320, base layer 110, first tie layer 310, and first skin layer 120. The second surface, i.e., the outer surface, of second skin layer 220 is surface-treated, metallized, and an image is subsequently printed on the metallized surface. An image is also printed on the untreated first surface, i.e., the outer surface, of cavitated first skin layer 120, and the printed, untreated first surface of first skin layer 120 is subsequently laminated to a substrate 420 via a cold glue adhesive 410. The substrate 420 may be a packaging material such as a transparent bottle.

The printed and metallized second surface of second skin layer 220 represents the so-called front-side of film label composite 400. As the main focus of an individual looking at the front of substrate 420, e.g., at the front of a bottle, it will be a primary advertising or information display area.

The printed and untreated first surface of cavitated first skin layer 120 represents the so-called back-side of film label composite 400. If the substrate 420 is a transparent substrate, the printed back-side may serve as a valuable secondary advertising or information display area, where promotions, ingredient lists, coupons, game pieces, etc. may be displayed. Even if the substrate 420 is an opaque substrate, there is value to a back-side that is a strong print surface. For example, in a hot-melt adhesive application, a coupon or game piece may be printed on the back-side of a film label composite so that the coupon or game piece can only be viewed after an end-user removes the label from the substrate. Unlike a cold-glue application, adhesive is applied to a relatively small area of the film label composite when adhering to a substrate in a hot-melt adhesive application, permitting easier removal of the, e.g., coupon or game piece.

An important feature of this particularly preferred embodiment is that the untreated first surface of cavitated first skin layer 120 is used not only to affix the film label composite to the substrate, but also to establish an additional printing surface. It was an unexpected surprise that the untreated, cavitated first skin layer 120 provides a stable print medium that exhibits excellent printability properties, without sacrificing initial adhesion or fiber tear when laminated to a substrate.

Initial adhesion relates to the ability of a film label composite to lock into position after laminating the film label composite to a substrate with, e.g., a cold glue adhesive, and the ability of the film label composite to remain locked-up even after a manual attempt to slide the label across the substrate.

Fiber tear relates to how much of the film label composite delaminates and remains on a substrate after laminating the film label composite to a substrate with, e.g., a cold glue adhesive, and thereafter peeling the film label composite off the substrate. If more than 50% of the label delaminates and remains on the substrate, the label is said to exhibit good fiber tear. If less than 50% of the label remains on the substrate, the label is said to exhibit poor fiber tear. The time between the laminating step and the peeling step can vary. In one example of a fiber tear test, the film label composite is laminated to a substrate with a cold glue adhesive, and cured for two weeks at 38° F. before attempting the peel step.

The strong initial adhesion and fiber tear properties exhibited by the present film label composite are surprising, especially when it is noted that (i) the cavitated first skin layer is untreated and (ii) cold glue adhesives tend to be water-based, and water-based adhesives tend to perform poorly with an untreated thermoplastic polymer, such as the polyolefins that are preferred for use in the first skin layer of the present invention. It was even more surprising that the untreated, cavitated first skin layer was able to maintain its strong initial adhesion and fiber tear properties when laminated to a substrate, while also providing a stable print medium with excellent printability properties.

EXAMPLE

| LAYER | COMPOSITION | THICKNESS |
| --- | --- | --- |
| L1 | Ethylene-propylene copolymer second skin | 3 gauge units |
| L2 | Propylene homopolymer (PP) tie layer | 20–35 gauge units |
| L3 | Cavitated base (PP + Pearl 2 (4.9% $CaCO_3$)) | 95 gauge units |
| L4 | Cavitated tie layer (PP + Pearl 70 (35% $CaCO_3$)) | 20–35 gauge units |
| L5 | Cavitated first skin (PP + Pearl 70 (35% $CaCO_3$)) | 10 gauge units |

The individual layers (L1–L5) were prepared in a corresponding extruder and coextruded through a single die to the desired thicknesses.

Second skin layer L1, the front-side of the film label composite, was EP 8573, an ethylene-propylene copolymer available from Fina Oil and Chemicals Co., in Dallas, Tex.

First skin layer L5, the back-side of the film label composite, was prepared by mixing a propylene homopolymer, such as Exxon 4612 or Fina 3371, with Pearl 70, which is a masterbatch of propylene homopolymer and calcium carbonate ($CaCO_3$), such that first skin layer L5 contained 35% $CaCO_3$. The mean particle size of the $CaCO_3$ was about 2.0 μm.

Tie layer L4 was prepared from the same ingredients (propylene homopolymer and Pearl 70 masterbatch) and in the same ratio (tie layer L4 contained 35% $CaCO_3$) as first skin layer L5, but to a different thickness. Tie layer L2 was propylene homopolymer, such as Exxon 4612 or Fina 3371.

Base layer L3 was prepared by mixing a propylene homopolymer, such as Exxon 4612 or Fina 3371, with Pearl 2, which is a masterbatch of propylene homopolymer and calcium carbonate ($CaCO_3$), such that base layer L3 contained 4.9% $CaCO_3$. The mean particle size of the $CaCO_3$ was about 1.4 μm.

After coextruding to form a L1/L2/L3/L4/L5 structure, the outer surface of second skin layer L1 was surface-treated and an image was printed thereon, and first skin layer L5 was left untreated, an image was printed thereon, and it was laminated to a glass packaging container with a cold glue adhesive.

A visual test was developed to determine both the quality of the print and the overall appearance of the composite label when both L1 and L5 are printed. It has been found, and the results demonstrate, that the appearance of the printed image on L5 provides an excellent surface for displaying a second untarnished image as it is observed through the packaging container. In particular, the cavitated surface of skin layer L5, without treatment provides a stable print medium without sacrificing initial tack and fiber tear.

While the invention has been described in detail with reference to specific embodiments thereof, it will be apparent to one skilled in the art that various changes and modifications can be made, and equivalents employed, without departing from the scope of the appended claims.

What is claimed is:

1. A thermoplastic film label composite, comprising:
   (a) a base layer comprising a thermoplastic polymer and a first cavitating agent, wherein the base layer has a first side and a second side;
   (b) a first skin layer for receiving a glue adhesive, wherein the first skin layer comprises a thermoplastic polymer and a second cavitating agent, the first skin layer has a first side and a second side, and the first skin layer is untreated;
   (c) a second skin layer comprising a thermoplastic polymer, wherein the second skin layer has a first side and a second sides;
   (d) a first tie layer comprising a thermoplastic polymer, wherein the first tie layer has a first side and a second side, the second side of she first tie layer is adjacent to the first side of the base layer, and the first tie layer is between the base layer and the first skin layer; and
   (e) a second tie layer comprising a thermoplastic polymer, wherein the second tie layer has a first side and a second side, the first side of the second tie layer is adjacent to the second side of the base layer, and the second tie layer is between the base layer and the second skin layer,
   wherein thermoplastic film label composite is a biaxially oriented film label composite.

2. The thermoplastic film label composite of claim 1, further comprising a printed image on the first side of the first skin layer.

3. The thermoplastic film label composite of claim 2, wherein the printed image comprises a water-based ink.

4. The thermoplastic film label composite of claim 2, wherein the printed image comprises a solvent-based ink.

5. The thermoplastic film label composite of claim 1, further comprising a printed image on the first side of the first skin layer, and a printed image on the second side of the second skin layer.

6. The thermoplastic film label composite of claim 5, wherein the second side of the second skin layer has been surface-treated prior to having the image printed thereon.

7. The thermoplastic film label composite of claim 6, wherein the second side of the second skin layer has been surface-treated and metallized prior to having the image printed thereon.

8. The thermoplastic film label composite of claim 5, wherein the second side of the second skin layer has been coated prior to having the image printed thereon.

9. The thermoplastic film label composite of claim 1, wherein the first cavitating agent and the second cavitating agent are different cavitating agents.

10. The thermoplastic film label composite of claim 9, wherein the first cavitating agent has a mean particle size of from 0.5 to 2.5 µm and individual particle sizes ≦8 µm.

11. The thermoplastic film label composite of claim 10, wherein the second cavitating agent has a mean particle size of from 1 to 3 µm and individual particle sizes S 10 µm.

12. The thermoplastic film label composite of claim 9, wherein the base layer comprises from 2–25 wt % of the first cavitating agent, based on the total weight of the base layer.

13. The thermoplastic film label composite of claim 12, wherein the first skin layer comprises from 8–60 wt % of the second cavitating agent, based on the total weight of the first skin layer.

14. The thermoplastic film label composite of claim 1, wherein the thermoplastic polymer of the first skin layer computes a polyolefin selected from the group consisting of propylene homopolymer, propylene copolymer, and highly crystalline polypropylene.

15. The thermoplastic film label composite of claim 1, wherein the first tie layer further comprises a cavitating agent.

16. The thermoplastic film label composite of claim 1, wherein one or more tie layers are between the first skin layer and the base layer in addition to the first tie layer, and one or more tie layers are between the second skin layer and the base layer in addition to the second tie layer.

17. A method of manufacturing the thermoplastic film label composite of claim 1, comprising the steps of:
   (i) coextruding melts corresponding to the base layer, the first skin layer, the second skin layer, the first tie layer, and the second tie layer to form a coextruded sheet;
   (ii) casting the coextruded sheet;
   (iii) quenching the coextruded sheet; and
   (iv) orienting the coextruded sheet to form a film for receiving a glue adhesive on the first skin layer.

18. The method of claim 17, further comprising the step of printing an image on the first side of the first skin layer prior to depositing a cold glue adhesive thereon.

19. A laminate, comprising the thermoplastic film label composite of claim 1 laminated at the first side of the first skin layer by cold glue adhesive (f) to a substrate.

20. The laminate of claim 19, wherein the substrate is a transparent packaging container, and the laminate further comprises a printed image on the first side of the first skin layer such that the cold glue adhesive (f) is on the first side of the printed first skin layer and the printed first skin layer is visible through the substrate.

21. A laminate, comprising the thermoplastic film label composite of claim 1 laminated at the first side of the first skin layer by a hot-melt adhesive (f) to a substrate.

22. The laminate of claim 21, wherein the substrate is an opaque packaging container, and the laminate further comprises a printed image on the first side of the first skin layer such that the cold glue adhesive (f) is on the first side of the printed first skin layer and the printed first skin layer is visible upon removing the film label composite from the substrate.

23. A thermoplastic film label composite, comprising:
   (a) a base layer comprising a thermoplastic polymer, wherein the base layer has a first side and a second side and does not comprise a cavitating agent;
   (b) a first skin layer for receiving a glue adhesive, wherein the first skin layer comprises a thermoplastic polymer and a cavitating agent, the first skin layer has a first side and a second side, and the first skin layer is untreated;
   (c) a second skin layer comprising a thermoplastic polymer, wherein the second skin layer has a first side and a second side;
   (d) a first tie layer comprising a thermoplastic polymer, wherein the first tie layer has a first side and a second side, the second side or the first tie layer is adjacent to the first side of the base layer, and the first tie layer is between the base layer and the first skin layer; and
   (e) a second tie layer comprising a thermoplastic polymer, wherein the second tic layer has a first side and a second side, the first side of the second tie layer is adjacent to the second side of the base layer, and the second tie layer is between the base layer and the second skin layers
   wherein the thermoplastic film label composite is a biaxially oriented film label composite.

24. The thermoplastic film label composite of claim 23, further comprising a printed image on the first side of the first skin layer.

25. The thermoplastic film label composite of claim 23, further comprising a printed image on the first side of the first skin layer, and a printed image on the second side of the second skin layer.

26. The thermoplastic film label composite of claim 23, wherein the first tie layer further comprises a cavitating agent.

27. A laminate, comprising the thermoplastic film label composite of claim 23 laminated at the first side of the first skin layer by a cold glue adhesive (f) to a substrate.

28. The laminate of claim 27, wherein the substrate is a transparent packaging container, and the laminate further comprises a printed image on the first side of the fist skin layer such that the cold glue adhesive (f) is on the first side of the printed first skin layer and the printed first skin layer is visible through the substrate.

29. A laminate, comprising the thermoplastic film label composite of claim 23 laminated at the first side of the first skin layer by shot-melt adhesive (f) to a substrate.

30. The laminate of claim 29, wherein the substrate is an opaque packaging container, and the laminate further comprises a printed Image on the first side of the first skin layer such that the hot-melt adhesive (f) is on the first side of the printed first skin layer and the printed first skin layer is visible upon removing the film label composite from the substrate.

31. The thermoplastic film label composite of claim 1, wherein the thermoplastic film label composite is biaxially oriented by stretching it from 3 to 7 times in a machine direction (MD) and from 5 to 10 times in a transverse direction (TD).

32. The thermoplastic film label composite of claim 23, wherein the thermoplastic film label composite is biaxially oriented by stretching it from 3 to 7 times In a machine direction (MD) and from 5 to 10 times in a transverse direction (TD).

33. A thermoplastic film label composite, comprising (a) a base layer comprising a thermoplastic polymer and a first cavitating agent, wherein the base layer has a first side and a second side;

(b) a first skin layer for receiving a glue adhesive, wherein the first skin layer comprises a thermoplastic polymer and a second cavitating agent, the first skin layer has a first side and a second side, and the first skin layer is untreated;

(c) a second skin layer comprising a thermoplastic polymer, wherein the second skin layer has a first side and a second side;

(d) a first tie layer comprising a thermoplastic polymer, wherein the first tie layer has a first side and a second side, the second side of the first tie layer is adjacent to the first side of the base layer, and the first tie layer is between the base layer and the first skin layer; and (e) a second tie layer comprising a thermoplastic polymer, wherein the second tie layer has a first side and a second side, the first side of the second tie layer is adjacent to the second side of the base layer, and the second tie layer is between the base layer and the second skin layer, further comprising a primed image on the first side of the first skin layer, and a printed image on the second side of the second skin layer, wherein the second side of the second skin layer has been surface-treated and metallized prior to having the image printed thereon.

34. A thermoplastic film label composite, comprising:

(a) a base layer comprising a thermoplastic polymer, wherein the base layer has a first side and a second side and does not comprise a cavitating agent;

(b) a first skin layer for receiving a glue adhesive, wherein the first skin layer comprises a thermoplastic polymer and a cavitating agent, the firs: skin layer has a first side and a second side, and the first skin layer is untreated;

(c) a second skin layer comprising a thermoplastic polymer, wherein the second skin layer has a first side and a second side;

(d) a first tie layer comprising a thermoplastic polymer, wherein the first tie layer has a first side and a second side, the second side of the first tie layer is adjacent to the first side of the base layer, and the first tie layer is between the base layer and the first skin layer; and (e) a second tie layer comprising a thermoplastic polymer, wherein the second tie layer has a first side and a second side, the first side of the second tie layer is adjacent to the second side of the base layer, and the second tie layer is between the base layer and the second skin layer, further comprising a printed image on the first side of the first skin layer, and a printed image on the second side of the second skin layer, wherein the second side of the second skin layer has been surface-treated and metallized prior to having the image printed thereon.

* * * * *